June 26, 1962 R. G. RUTHERFORD 3,040,418
NEEDLE LOADING MACHINE
Filed May 21, 1959 2 Sheets-Sheet 1
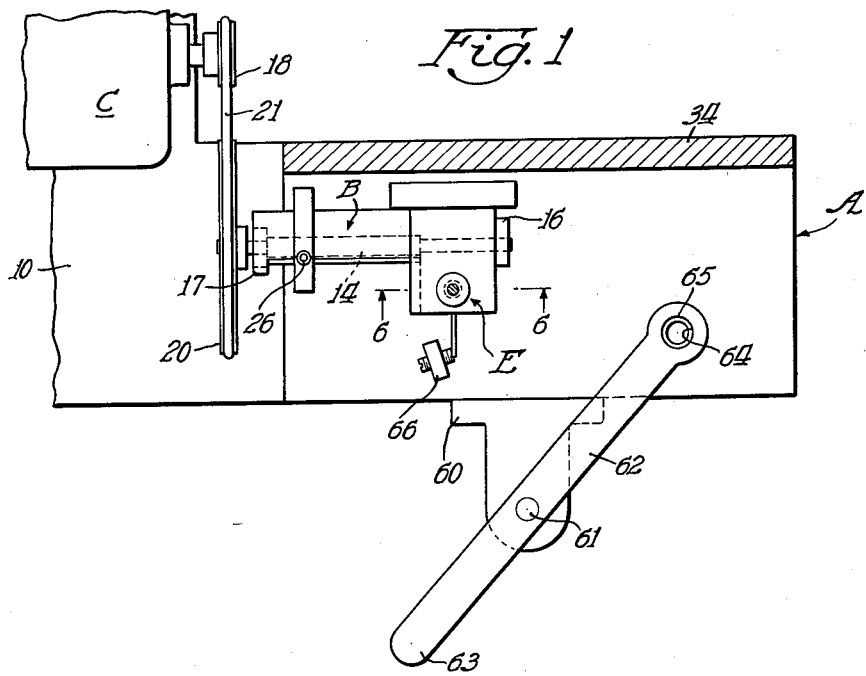
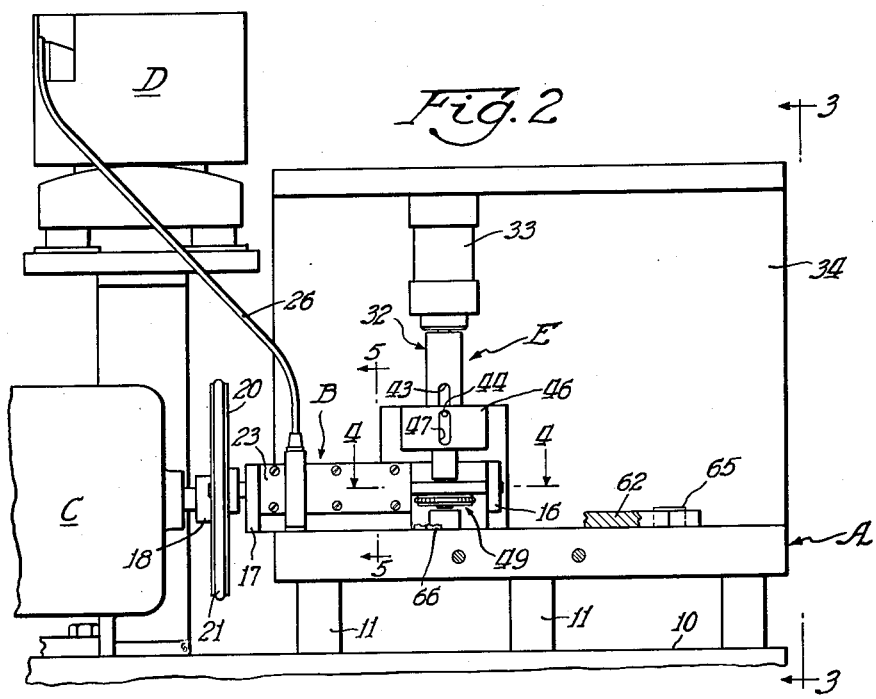
Inventor:
Russell G. Rutherford
By: W. S. McCurry Atty.

June 26, 1962 R. G. RUTHERFORD 3,040,418
NEEDLE LOADING MACHINE
Filed May 21, 1959 2 Sheets-Sheet 2
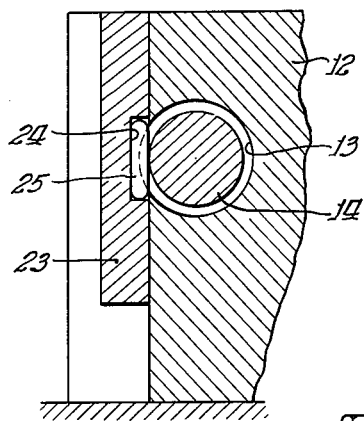
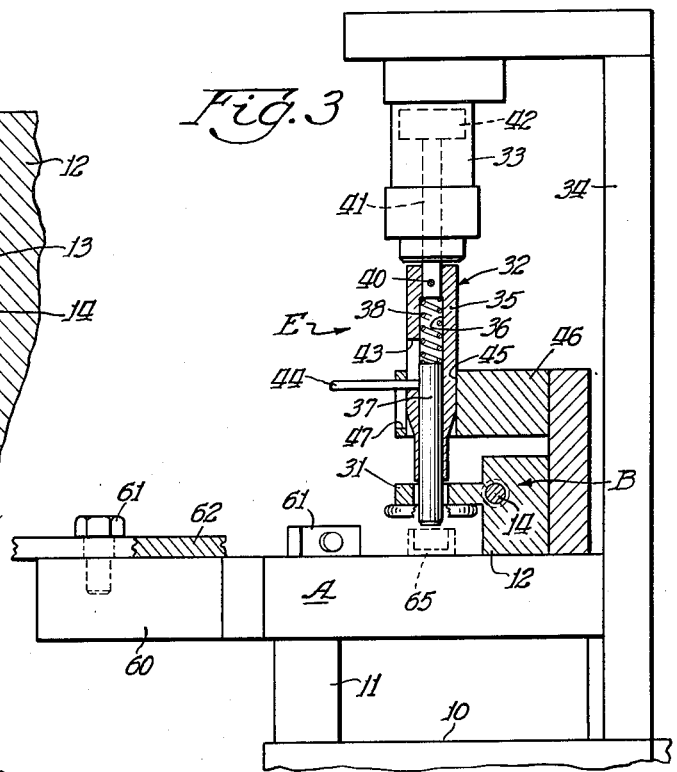
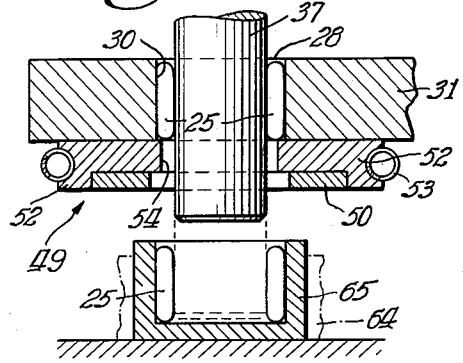
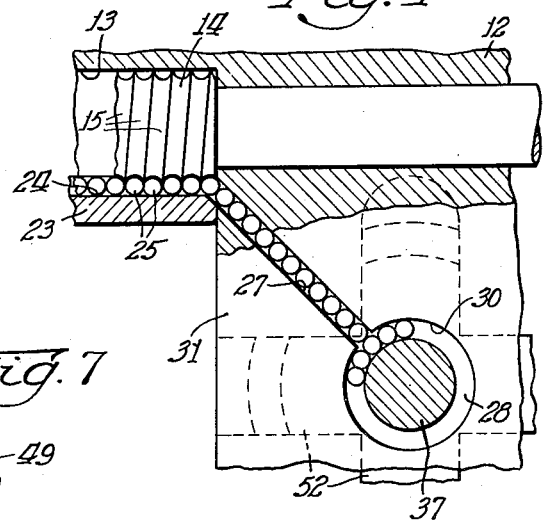
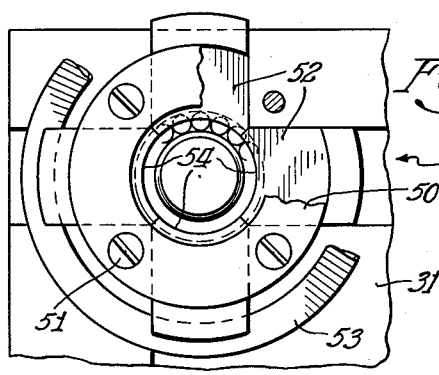
Inventor:
Russell G. Rutherford
By: W. S. McCurry Atty

3,040,418
Patented June 26, 1962

3,040,418
NEEDLE LOADING MACHINE
Russell G. Rutherford, Roscoe, Ill., assignor to Borg-Warner Corporation, Chicago, Ill., a corporation of Illinois
Filed May 21, 1959, Ser. No. 814,851
3 Claims. (Cl. 29—201)

The present invention relates to a new and improved machine for loading and assembling roller bearings.

The principal object of the invention is to provide a simple, compact machine for assembling roller bearings in a cup-shaped retainer.

In Rehnberg Patent No. 2,057,692 there is disclosed a roller bearing assembling machine which has enjoyed considerable commercial success. However, one drawback of this machine is that the rollers are fed by gravity, resulting in a relatively long loading time for each bearing assembled. My invention reduces considerably the time for loading the needle bearings in the retainers.

Thus, an important feature of the present invention is the feeding of the rollers to the retainers by a forced feed rather than by gravity. I employ a rotated screw to feed the roller bearings to the cup-shaped bearing retainers and find that the loading time can be decreased by as much as fifty percent, resulting in a considerable savings in the assembly operation.

The present invention consists of the novel constructions, arrangements and devices to be hereinafter described and claimed with respect to a preferred embodiment of the invention illustrated with reference to the accompanying drawings wherein:

FIG. 1 is a top plan view of the needle bearing loading machine;

FIG. 2 is an elevational view;

FIG. 3 is an elevational view partly in section taken one the line 3—3 of FIG. 2;

FIG. 4 is a sectional view taken on the line 4—4 of FIG. 2;

FIG. 5 is a cross sectional view taken on the line 5—5 of FIG. 2;

FIG. 6 is an enlarged fragmentary sectional view of the needle support incorporated in the present machine taken on line 6—6 of FIG. 1; and FIG. 7 is a bottom plan view of the needle support shown in FIG. 6.

Referring to the drawings, wherein like reference numerals in the different views designate identical parts, the present roller assembling machine, in general, comprises a support or base A having mounted thereon a feed screw B which is adapted to be driven by an electric motor C; a solenoid vibrated Cyntron hopper D for the storage of rollers and from which the rollers are fed into the screw B; and an assembling pilot E.

The base A is adapted to be positioned on any suitable table or bench 10 and is spaced therefrom and supported thereon by a plurality of pillars 11.

The feed screw mechanism B comprises a housing 12 secured to the base A and having a longitudinal bore 13 therein for receiving a screw 14. The screw 14 has threads 15 thereon and its ends are smooth cylindrical surfaces rotatable in and supported by bearings 16 and 17. The screw 14 is adapted to be driven by the electric motor C by means of a pulley 18 on the motor shaft, a pulley 20 securely fixed to one end of the screw 14, and a belt 21. As best seen in FIG. 4, the bore 13 has an open side through which the threads 15 extend. A cover plate 23 is spaced from the screw 15 to provide a trough 24 for the transport of the needles 25. The trough 24 communicates near one end with a bearing feeding conduit 26 for transporting bearings received from the hopper D; and the other end of the trough 24 communicates with an inclined slot 27. The slot 27 communicates with a space 28 formed by the walls of a cylindrical bore 30 formed in a support block 31 and a plunger 32.

The plunger ejector means 32 is adapted to be actuated by a servo motor 33 mounted on a support 34. Any suitable pneumatic or hydraulic medium may be employed to operate the servo motor 33.

The plunger 32 is made of two parts, an outer reciprocable sleeve 35 having a bore 36 therein for receiving an inner reciprocable punch 37. A spring 38 is disposed within the bore 36 and acts to urge the punch 37 outwardly of the outer sleeve 35. The outer sleeve 35 is attached by a pin 40 to rod 41 of the piston 42 of the servo motor 33 whereby the sleeve 35 may be moved downwardly by the servo motor.

The outer sleeve 35 contains an elongated vertically extending slot 43 which receives an elongated pin 44 which is attached to the inner punch 37. The diameter of the elongated pin 44 is only about one-half the width of the slot 43 so that the pin 44 can be moved back and forth or oscillated by the operator of the bearing loading machine.

The plunger 32 is reciprocable within a bore 45 formed in a pilot block 46. A slot 47 is formed in the pilot block to permit oscillation and reciprocation of the pin 44.

Means are provided on the support block 31 for supporting the bearings as they are delivered by the lead screw 14 to the cylindrical bore 30 during the loading operation. The support is identified in the drawings generally by the reference numeral 49 and comprises a retainer ring 50, see FIG. 6, secured by screws 51 to the bottom of the support block 31. A plurality of jaws 52 are carried by the retainer ring 50 and spaced between the screws 51. The jaws 52 are held in place and urged inwardly by a garter spring 53. The four radii 54 of the inner edges of the jaws 52 form a circular ledge for supporting the bearings as they enter the bore 30. Mounted on an extension 60 of the base A by means of a pivot bolt 61 is a lever arm 62. The lever arm 62 has a handle portion 63 on one end of its pivot point and a cylindrical bore 64 on the other end thereof. The bore 64 is adapted to receive and hold a bearing cup or retainer 65. An adjustable stop block 66 is mounted on the base A. The stop block is so positioned on the base to stop the lever arm 62 when the bore 64 is directly underneath punch 37 and needle support 49.

*Operation*

The motor C and the Cyntron hopper D are energized by an appropriate switch or switches (not shown). The hopper D discharges the needle bearings 25 into the conduit 26 from whence they are discharged into the trough 24 where the rotating screw 14 advances the needle bearings into the slot 27 and into the space 28 formed by the walls of the bore 30 and the punch 37. During the entry of the needle bearings into the space 28, the punch 37 is oscillated by means of the elongated pin 44 to provide a uniform distribution of bearings in the space. The needle bearings 25 are supported in the space 28 by means of the jaws 52. As soon as the space 28 is filled with needle bearings, the screw 14 will be prevented from rotating and at this time, the motor C will not drive the lead screw but will merely drive the pulley 18 which will slip on the belt 21.

The lever arm 62 is moved by means of the handle portion 63 against the stop block 66 and into a position beneath the retainer. After the space 28 is filled, the servo motor 33 is actuated by any appropriate pneumatic or hydraulic fluid system to force the plunger 32 downwardly. The leading portion of the outer sleeve 35 engages the needles as it slides relative to the punch 37 and due to the radii of the needle bearings, the bearings act as a cam and force the jaws 52 outwardly whereby the needles are pushed into the bearing cup 65. The plunger 32 is retracted and the lever arm 62 is rotated to the right as seen in FIG. 1 and the bearing cup 65 with its assembled needle bearings is removed from the bore 64.

It can thus be seen from the above description and operation of the machine that there has been provided a simple, inexpensive bearing loader which, due to its forced feed, will load bearings much faster and with more efficiency than conventional and well known bearing loaders.

I claim:

1. A device for loading needle bearings into the bearing retainer comprising the combination; a support block having a bore therein; a housing having an interior wall; a screw rotatably mounted in said housing and having threads adapted to receive said needle bearings for urging said bearings along said housing wall toward one end thereof; conduit means for receiving said needle bearings in single file order and communicating said housing one end with said block bore, means for providing a supply of needle bearings to the other end of said housing; means for driving said screw; a punch in said block bore for annularly aligning said needle bearings; holding means adapted to retain said needle bearings in said bore; and ejector means for overcoming the effect of said holding means and for forcing said aligned needle bearings out of said bore while in proper order into the bearing retainer.

2. A device for loading needle bearings into a bearing retainer, as in claim 1, in which said holding means comprises a plurality of jaws arranged circumferentially about said punch, a retainer ring for supporting said jaws, and an annular garter spring adapted to urge said jaws radially toward the punch.

3. A device for loading needle bearings into a bearing retainer, as in claim 1, in which said ejector means comprises a plunger sleeve adapted to be extended between said block bore and said punch for forcing said needle bearings out therefrom, means for extendibly moving said plunger sleeve, and resilient means connecting said punch and plunger sleeve to provide a lost motion connection therebetween so that said sleeve and punch may move together in unison in response to said moving means after said lost motion is taken up.

References Cited in the file of this patent

UNITED STATES PATENTS

| | | |
|---|---|---|
| 1,250,047 | Swanson | Dec. 11, 1917 |
| 1,750,310 | Jonkel | Mar. 11, 1930 |
| 2,057,692 | Rehnberg | Oct. 20, 1936 |
| 2,172,145 | Rehnberg | Sept. 5, 1939 |
| 2,844,865 | Cook | July 29, 1958 |